Figure 1:
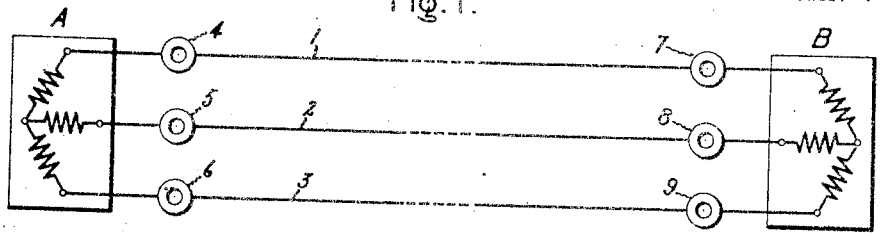

E. E. F. CREIGHTON.
PROTECTION OF TRANSMISSION SYSTEMS.
APPLICATION FILED APR. 7, 1916.

1,313,072.

Patented Aug. 12, 1919.
2 SHEETS—SHEET 1.

Inventor:
Elmer E. F. Creighton,
by Albert G. Davis
His Attorney.

E. E. F. CREIGHTON.
PROTECTION OF TRANSMISSION SYSTEMS.
APPLICATION FILED APR. 7, 1916.

1,313,072.

Patented Aug. 12, 1919.
2 SHEETS—SHEET 2.

Inventor:
Elmer E. F. Creighton,
by Albert G. Davis
His Attorney.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTION OF TRANSMISSION SYSTEMS.

1,313,072.　　　　Specification of Letters Patent.　　Patented Aug. 12, 1919.

Application filed April 7, 1916. Serial No. 89,583.

*To all whom it may concern:*

Be it known that I, ELMER E. F. CREIGHTON, a citizen of the United States, residing at Schenectady, county of Schenectady, State of New York, have invented certain new and useful Improvements in the Protection of Transmission Systems, of which the following is a specification.

My invention relates to the protection of transmission systems and more particularly to means for disconnecting a feeder upon which a fault has occurred and for selectively indicating the phase of the feeder at fault.

The object of my invention is to provide a novel and improved means of protection for a system of distribution upon the occurrence thereon of a fault and especially to protect a system of distribution upon the occurrence thereon of a broken line wire or an open circuit.

My novel means of protection comprises, in general a phase selective relay operative in response to an unbalancing of the load or power conditions between phases on a feeder, this relay operating with a differential action to select the phase of the feeder at fault. This relay will protect a system from nearly every condition of broken line wire but to meet a few conditions that may exist upon which my phase selective relay may not be operative, I prefer to use in combination with my phase selective relay, another relay which is operative in response to an unbalancing between any phase and ground. With these two types of relays, I am able to protect any system of distribution under every condition which may exist thereon, when a break in a line wire or an open circuit occurs, by disconnecting the faulty feeder from the system, notifying the operator of the opening of the feeder circuit and selectively indicating the faulty phase of the faulty feeder. The type of phase selective relay or load or power responsive device which I have developed to respond to unbalancing of the load or power conditions between phases is applicable to both non-grounded and grounded systems but the relay which I use responsive to unbalancing between the system and ground is of a different construction dependent upon whether the system to be protected is operated with a grounded or non-grounded neutral.

The novel features which I believe to be characteristic of my invention will be definitely indicated in the claims appended hereto; the features of construction and mode of operation will be understood by reference to the following description taken in connection with the accompanying drawings in which:—

Figure 2:
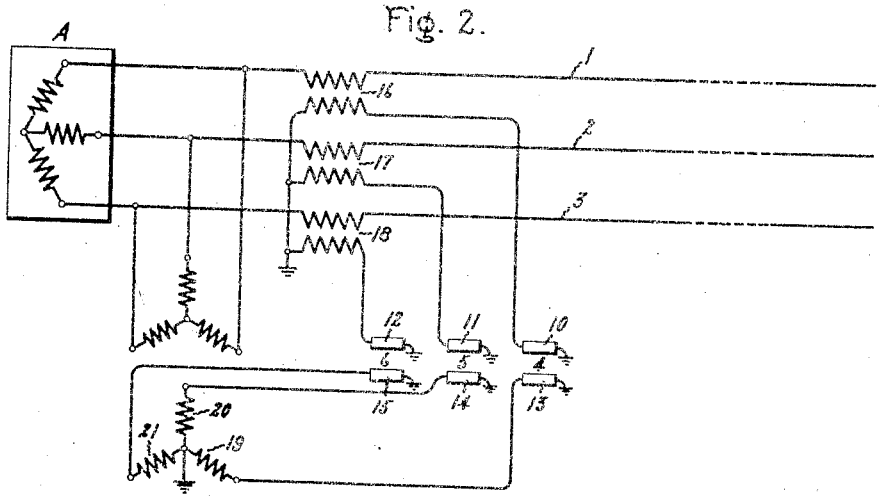
Figure 3:
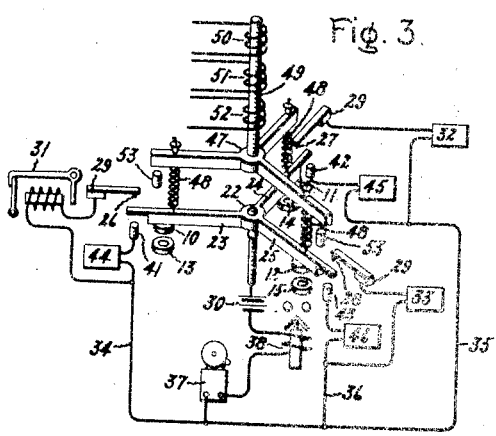
Figure 4:
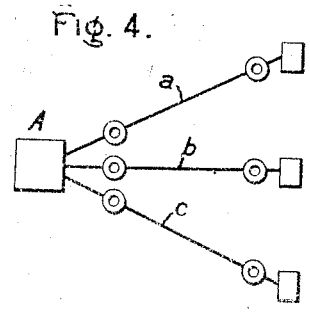
Figure 5:
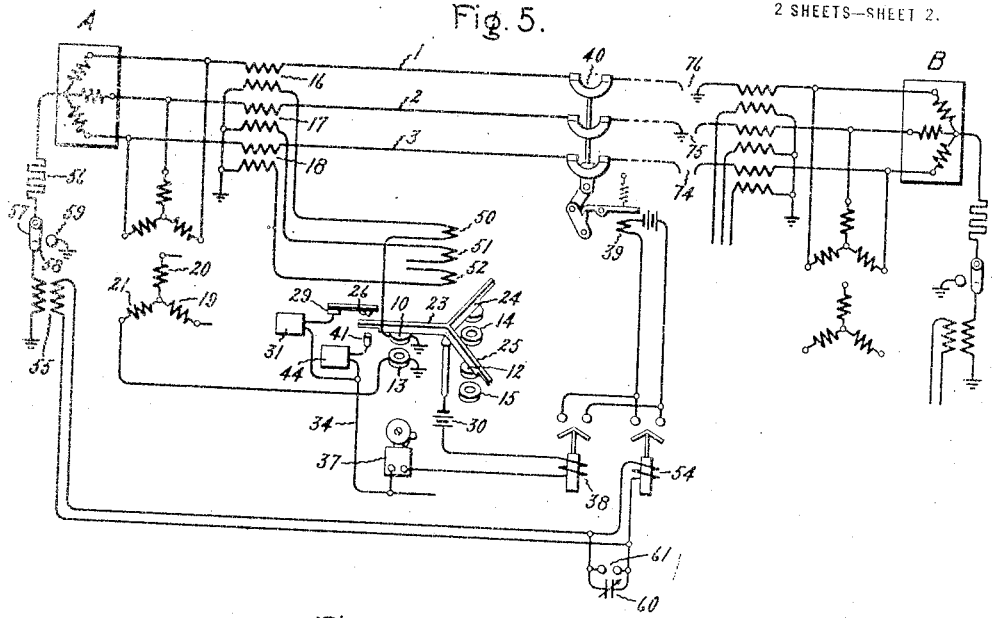
Figure 6:
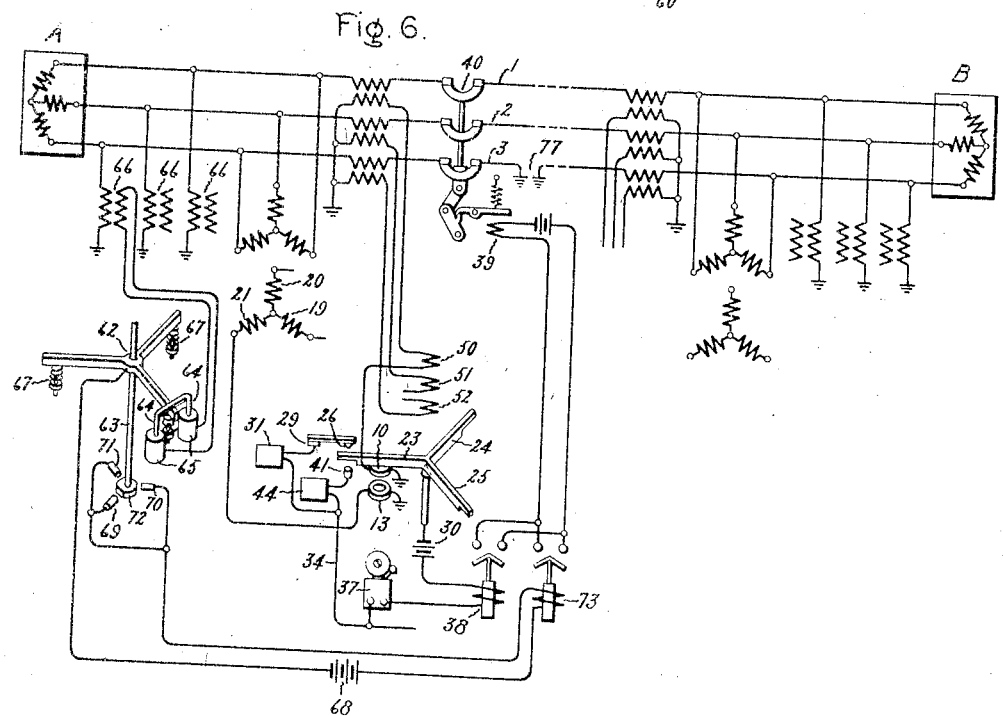

Figure 1 shows diagrammatically, the application of my phase selective relay connected to a single feeder of a system of distribution. Fig. 2 is a diagrammatic view of the connections of this relay to the line to be protected. Fig. 3 is a more detailed view of the relay itself. Fig. 4 is a diagrammatic view of a system comprising a plurality of feeders embodying the principles of my invention. Fig. 5 shows my invention applied to the protection of a single feeder of a system of distribution having a grounded neutral, and Fig. 6 shows my invention applied to the protection of a single feeder of a non-grounded system.

It will be apparent that when a line wire breaks on a transmission line, a great number of different conditions may exist which vary depending on whether the system has a grounded or non-grounded neutral, whether current or power can be fed from both ends of the system or only from one end. The conditions existing on the system also depend in each of these instances, upon the character of the break, that is, whether the break is such that neither end of the line wire touches the ground, that is, an open circuit; whether only one end of the line wire touches the ground; or whether both ends of the line wire touch the ground. Each of these conditions also vary according to whether the break occurs near the power station or out on the line and whether the wire or wires grounded form high, medium or low resistance paths.

Broken line wires cause very detrimental conditions to exist on transmission lines. Under some conditions polyphase apparatus will be operated single phase or may be destroyed due to overheating, while under other conditions a broken line wire may exist without being known at the central station. Under all conditions a broken line wire is a great menace to life and it is, therefore, imperative that such a condition on a system should be remedied as quickly as possible.

In Fig. 1 is shown a feeder 1, 2, 3 of a polyphase transmission line connected between two stations A and B. To protect this feeder upon the occurrence of a broken line wire, I connect at both ends of the feeder, at stations A and B, one of my phase selective or load responsive relays, which I have shown diagrammatically, as comprising three wattmeter elements 4, 5, 6 and 7, 8, 9 respectively, one element of each relay being connected to each phase. The wattmeter elements comprising my phase selective relay are arranged to operate differentially in response to load or power unbalancing between the phases of the feeder.

As is well understood, a wattmeter element depends for its action on the product of current, potential and the cosine of the angle θ, where θ is the angle of phase displacement between the current and potential, that is, the torque or pull of a wattmeter element is a function of or proportional to the product of current, potential and power factor. If any one of these factors falls to practically zero, it is evident that the wattmeter element has practically no torque or pull as the product of the factors is then zero. The occurrence of a broken line wire may cause any of these factors to fall to zero depending on the character of the break and the nature of the system and I depend upon these principles to obtain a selective action on my wattmeter element relay.

For the application of my selective relay to the protection of a system of distribution, I have shown in Fig. 1 one feeder connected between two stations, A and B, it being understood that such feeder may be one of several in parallel or one of several radial feeders, such as shown in Fig. 5, or may be one between two stations on a system having several stations in series in which case a selective relay is connected on both sides of the stations.

To more clearly show the connection of the wattmeter elements of my selective relay to the feeder to be protected I have diagrammatically shown in Fig. 2, the connections of my relay at station A comprising wattmeter elements 4, 5 and 6 it being understood that my relay comprising wattmeter elements 7, 8 and 9 are similarly connected at station B. Each of the wattmeter elements 4, 5 and 6 consist of current coils 10, 11, and 12 and potential coils 13, 14 and 15, respectively, each current coil receiving current from its respective phase through the secondaries of current transformers 16, 17, and 18 and each potential coil receiving the potential of its respective phase through the secondaries of potential transformers 19, 20 and 21. Wattmeter elements 4, 5 and 6, therefore, receive current and potential from their corresponding phase 1, 2 and 3, respectively.
In order to obtain a differential action between the wattmeter elements 4, 5 and 6 comprising my selective relay, I provide as shown in Fig. 3, a common armature or three armed member 22 pivotally supported at its center and comprising arms 23, 24 and 25, 120° apart which carry thereon, the current coils 10, 11, and 12, respectively, of wattmeter elements 4, 5 and 6 respectively. Mounted adjacent the current coils 10, 11 and 12 and coöperating relative therewith, are the corresponding potential coils 13, 14, and 15 respectively. The arms 23, 24 and 25 of member 22 are therefore movable in response to the wattmeter elements 4, 5 and 6, respectively. Under normal condition the pulls exerted on each arm by their respective wattmeter elements are equal and hence the member or armature 22 is held electrically balanced. Should, however, the pull exerted on one arm, 23 for instance, by its wattmeter element 4 become weakened due to a reduction in one of the factors, current, potential or power factor on phase 1, the pull exerted on the other arms 24 and 25 by their wattmeter elements 5 and 6 respectively, move the member 22 so that arms 24 and 25 are moved down consequently raising arm 23.

To give an indication of the operation of my relay and to render it operative to select the phase at fault, I provide above each of the arms 23, 24 and 25, fixed contacts 26, 27 and 28, respectively which I have shown as preferably resiliently mounted on supporting members 29. When the relay is operated as has just been described, to move one of the arms 23, 24 or 25 upwardly, this arm closes a circuit from a source of excitation such as a battery 30, along arms 23, 24 or 25, through the contacts 26, 27 or 28, phase indicating or recording devices 31, 32 or 33, thence by conductors 34, 35, or 36 to a common alarm device or indicator 37 and then through a common auxiliary relay or solenoid 38 back to the battery 30. I have shown phase recording device 31 diagrammatically as a drop indicator, it being understood that devices 32 and 33 are similar and that these devices may be annunciators or like devices capable of maintaining an indication of the passage of an electric current. It is thus apparent that if the pull, for instance, of wattmeter element 4 is weakened corresponding to a faulty condition on phase 1, as previously stated, that its arm 23 is raised to engage its contact 26 and complete the circuit just described, causing the operation of its phase recorder 31, the alarm device 37 and the relay 38. The operation of alarm 37 gives the operator an indication of the operation of the relay, while relay 38 on becoming energized closes its contacts to complete the circuit of trip coil 39, as shown in Fig. 5, and thereby cause the opening of oil switch 40. As soon as the oil switch opens, the phase selective relay is deënergized and the armature 22 returns its arms 23, 24 and 25 to normal balanced condition. By observing, however, the phase recorders 31, 32 and 33 the phase which is at fault can be readily determined and the recorder returned to normal position.

In order to provide further selective action of my phase selective relay, under conditions to be later described, I provide my relay with a second set of contacts 41, 42 and 43 mounted below each of the arms 23, 24, and 25 respectively. These contacts are mounted at such a distance below the arms 23, 24 and 25 respectively, that when any arm moves to close its upper contact that, under ordinary conditions, the other arms of the relay will not engage their lower contacts. This is accomplished by the fact that the lower contacts cannot be engaged by their respective arms unless the pull moving the third arm upwardly is sufficient to overcome the tension exerted by the spring contacts 26, 27 and 28. Connected with each of the contacts 41, 42 and 43 are phase recording or indicating devices 44, 45 and 46, respectively, which are similar in all respects to phase recorders 31, 32 and 33. Phase recorders 44, 45 and 46 are connected to the conductors 34, 35 and 36, respectively, so that the contacts 41, 42 and 43 and phase recorders 44, 45 and 46, respectively, are in shunt relation to the contacts 26, 27, and 28 and phase recorders 31, 32 and 33 respectively. Irrespective, therefore, of whether one of contacts 26, 27 or 28 or one of contacts 41, 42 or 43 are engaged by their respective arms of members 22, the alarm device 37 and relay 38 are energized and by an examination of the phase recorders, the contact engaged can be determined.

In order that my wattmeter relay may respond to the same percentage of load unbalancing between the phases independent of the actual value of the load, I provide my relay with means for automatically maintaining the sensitivity of the relay constant under varying conditions of load so that the relay is always responsive to the same percentage of unbalancing irrespective of what the actual value of the load may be. This means comprises an additional three armed member 47 movably positioned above the armature 22, the arms of which coöperate with and are resiliently connected to the arms 23, 24 and 25 respectively by adjustable spring members 48 thereby providing a spring adjusting means for maintaining the arms 23, 24 and 25 of member 22 in mechanical balance. Secured to the member 47 is a rod 49 which with member 47 serves as an armature or core of a solenoid formed by the windings 50, 51 and 52 connected in series with the secondaries of current transformers 16, 17 and 18 respectively and current coils 10, 11 and 12 respectively of the wattmeter relay. In order to obtain a pull on the rod 49 which is proportional to the load on the feeder to be protected, I reverse one of the windings 50, 51 or 52 in relation to the other two, either by a reversed connection such as shown in Fig. 5 for winding 52 or by a reversed winding. I thus provide a means for automatically positioning member 47 proportional to the load and thereby automatically varying the tension on springs 48 proportional to the load on the feeder. For holding the member 47 in position when no load is upon the circuit, I provide stops 53 coöperating with each arm of member 47.

Let us assume for instance that the load on the feeder is 100 KW and the wattmeter selective relay is operative on an unbalancing of 1 KW, that is, on one per cent. unbalancing between phases. If now the load, for some reason, increases to 1000 KW, by the operation of my spring adjusting means, the relay is no longer operative on an unbalancing of 1 KW which would be one-tenth per cent. unbalancing but due to the solenoid windings 50, 51, 52, the member 47 is raised to assume a position proportional to the increased load and a proportionally increased tension thereby exerted upon the springs 48 so that to cause an operation of the relay, a greater tension of the springs must be overcome. Therefore due to the position of member 47, the tension on springs 48 is such that it requires an unbalancing of 10 KW before the relay will operate or as before an unbalancing of 1%. Thus I have provided means for maintaining the relay responsive to a fixed and definite percentage of unbalancing of the load conditions, irrespective of the actual value of the load on the feeder.

There are so many different conditions which may exist upon a transmission line when a line wire breaks, that it is practically impossible to provide one relay device to suitably respond to every possible condition. My wattmeter selective relay will protect the line from practically all conditions of broken line wires but to meet every emergency that may arise, I use, in some instances, in combination with this relay, another relay. To fully protect a single feeder of a grounded neutral system, I use as shown in Fig. 5, in combination with my wattmeter selective relay at station A, which is responsive to unbalancing of the power or load conditions on the feeder, a second relay which is responsive to unbalancing between the feeder and ground. It is understood as shown in Fig. 1 that a duplicate phase selective relay is connected at station B which I have omitted showing in Fig. 5 for reasons of clearness. This ground responsive relay 54 receives current from the secondary of a transformer 55 connected between the neutral of the system and ground. In this connection between the neutral of the system and ground, I also place a resistance 56 to limit the current to ground to a reasonable value. Normally, relay 54 is not energized but upon the occurrence of a break in any line wire causing a current to flow to ground, the relay 54 is energized and closes its contacts, which are in parallel to the contacts of the relay or solenoid 38, to complete the circuit of trip coil 39 for the oil switch 40 and thereby disconnect the feeder, the tripping coil 39 being arranged so that its circuit is completed in response to either the phase selective relay or the ground responsive relay.

In the connection between the neutral of the system and ground, I provide a disconnecting switch 57 which is adapted to engage either contacts 58 or 59 to connect or disconnect respectively the transformer 55 and hence render relay 54 operative or inoperative. In like manner I provide a duplicate relay connected in the neutral of the system at station B which may be rendered operative or not as desired. With a single feeder connected to a power station, as shown in Fig. 5, the switch 57 is moved to engage contact 58 thereby rendering the relay 54 operative but when several feeders are connected to the power station, relay 54 is not selective but is likely to open the circuits of all the feeders when a break occurs on any one and hence in such instances I move switch 57 to engage contact 59 and thereby hold the relay 54 inoperative.

When a system of distribution comprises a plurality of feeders, such as is shown in Fig. 4 in which a single line diagram is shown for each feeder, I use my phase selective relay on each end of each feeder, a, b, c which under practically all conditions of broken line will operate to select the feeder upon which a broken line wire occurs as only the relay on the faulty feeder will be operated, and will also select the phase of the feeder at fault as already described. To protect against these few conditions for which my ground responsive relay is applicable I use in combination with my phase selective relay, for a plurality of radial feeders, the relay scheme which is covered in the U. S. Patent 1,203,556 granted to Archibald H. Davis or for a plurality of parallel feeders, the relay scheme covered in the U. S. Patent 1,222,536 granted to Archibald H. Davis.

If such a condition exists that a break in a line wire causes both ends of the wire to touch the ground, when the load is light on the other two phases, my phase selective relay has difficulty in selecting such a fault. The high resistance to ground will, however, allow current to flow back through the neutral, and if there were but 60-cycle currents in the neutral, the detection of one of these extremely small currents due to the high resistance ground would be easy but there exists on nearly all systems harmonics which cause a current through the neutral to ground. In order, therefore, to make relay 54 sensitive, it must be selective for the 60 cycle current. This I accomplish by introducing into the relay circuit, a device 60 having a condenser action shunted by a spark gap 61 for purposes of safety. The condenser 60 has a variable capacitance which is so chosen relative to the inductance of the winding of relay 54 that a neutral frequency is given to this circuit corresponding to the generator frequency, by well-known principles of resonance. Any other frequency will find great difficulty in getting through the inductance offered by the winding of relay 54. Naturally the ratio of inductance to capacitance would be chosen to magnify this effect.

In Figs. 5 and 6 I have shown my phase selective wattmeter relay with connections for phase 1 only, it being understood that similar connections, as shown in Fig. 3, exist from the other two phases, these connections being omitted for reasons of clearness. For the same reason I have omitted the showing of my spring adjusting means for the relay, only the connection of windings 50, 51, and 52 being shown.

For protecting a feeder of a non-grounded neutral system for a few conditions for which my phase selective may not be selective, I use in combination with my phase selective wattmeter relay, as with grounded systems, a ground responsive relay but this relay is of different construction than the relay used to respond to the same conditions on grounded systems. This relay is of a construction similar to that shown and described in my application for Letters Patent, Ser. No. 492,846, and popularly known as my arcing ground suppressor relay. This relay, as shown in Fig. 6, comprises an armature or three armed member 62 pivotally supported at its center and carrying a contact rod 63 depending therefrom. Each arm of the member 62 carries movably supported thereon by knife edge bearings, bars 64 which carry the movable members or armatures of two electromagnets 65 connected in series and receiving current from the secondaries of potential transformers 66 connected between each phase and ground. Each arm of the relay is, therefore, responsive to the potential between each phase and ground. For reasons of clearness, I have shown the relay provided with the electromagnets 65 and connections, for one phase only it being understood that similar connections are made for the other two phases. The ground responsive relay is held in mechanical balance by adjustable springs 67 on each arm. Normally the pulls exerted on each arm are equal but when a break in a line wire occurs of a character to cause an unbalancing between the feeder and ground, a greatly reduced pull is exerted on the arm corresponding to the faulty phase or broken line wire which results in the pulls exerted on the other two arms of member 62 overcoming the pull of the arm corresponding to the faulty phase. The member 62 is thus actuated to cause the contact rod 63 to move into a position to close a circuit from the battery 68 through the corresponding fixed contact 69, 70 or 71, movable contact 72 carried by the rod 63, through the rod and thence through the auxiliary relay or solenoid 73 back to the battery 68. This solenoid 73 closes its contacts which are in parallel with the contacts closed by the solenoid 38 to close the circuit of the trip coil 39 and open the oil switch 40, both the phase selective and ground responsive relays operating a common tripping circuit for the oil switch.

As there are nearly a hundred conditions which may exist on a feeder when a line wire breaks depending on the character of the system and the nature of the break as heretofore outlined, a description of the operation of my protective means to protect a feeder under each condition would be prohibitive. In order however, to more clearly bring out my scheme of protection, I will briefly describe the operation of my protective means under a few of the many conditions existing upon the occurrence of broken line wires.

Let us take first the protection of a feeder on a grounded neutral system. To meet every condition of broken line that may occur on such a feeder, I use, my phase selective wattmeter or load responsive relay connected at both ends of the feeder in combination with my ground responsive relay 54 responsive to unbalancing between the feeder and ground. As an example of a character of break which may occur, we will assume one in which neither end of the line wire touches ground, as shown at 74 on phase 3, causing thereby an open circuit in phase 3. As conditions vary according to the position of the break on the feeder, we will assume such a break occurs near the power station A. As this character of break causes no appreciable unbalancing between the feeder and ground, relay 54 will be inoperative. An open circuit on phase 3, however, causes the current in this phase to fall practically to zero. This reduction of current in phase 3 causes, for the reasons previously stated, a zero pull on arm 25 of my selective relay by wattmeter element 6 corresponding to this phase. The pulls exerted on arms 23 and 24 by wattmeter elements 4 and 5 respectively, corresponding to phases 1 and 2 respectively, act to raise arm 25 and move it into engagement with its contact 28 to close a circuit as previously described through its phase recorder 23, the common alarm device 37 and auxiliary relay 38. The downward pull exerted by arms 23 and 24 is not sufficient to overcome the spring tension of contact 28 so that arms 23 and 24 are prevented, thereby, from engaging their lower contacts 41 and 42, respectively. Alarm device 37 notifies the operator of the operation of the relay and phase recorder 33 indicates phase 3 at fault and auxiliary relay 38 closes the tripping circuit through trip coil 39 to open the oil switch 40. In like manner my phase selective relay at station B simultaneously operates to indicate phase 3 at fault and open its oil switch due to a zero pull by wattmeter element 9.

Suppose a break occurs in which only the broken line wire nearest station A touches the ground, as shown at 75 on phase 2. If the ground is of low resistance it will be evident that the potential on phase 2 falls practically to zero with a consequent operation, for the reasons stated, of wattmeter element 5 to open the feeder and indicate the faulty phase. The wattmeter relay at station B also operates to select phase 2 at fault and open the feeder, due to the fall of current on phase 2 to zero causing a zero pull by wattmeter element 8. As this character of break causes an unbalancing between the feeder and ground, relay 54 also operates to open the oil switch due to the current to ground from phase 2 returning over the grounded neutral connection.

Suppose this character of break as shown at 75 occurred such that the resistance to ground was such that a great rush of current occurred to ground with little fall in potential i. e. the current increases more than the voltage decreases. Upon such a condition, the pull exerted by the wattmeter element 5 would be strong enough to overpower wattmeters 3 and 4 and pull the arm 24 of the relay down, engaging contact 42 and operating the alarm 37 and auxiliary relay 38 as before, but actuating phase recorder 45 to indicate phase 2 at fault. Arms 23 and 25 will close their upper contacts 26 and 28, respectively, thereby giving a false indication on their phase recorders 31 and 33 but it is understood that when one of the phase recorders 44, 45 or 46 give an indication of a faulty phase, that the operation of phase recorders 31 and 32 or 33 must be disregarded. If this condition of break was such that a ground occurred having a resistance of a value such that the load or power on phase 2 is equal to that of the normal power or load of the other two phases, then my phase selective relay would not be operative but this condition would be taken care of by the operation of relay 54.

If we assume a break occurs in which only the line wire nearest station B touches the ground through a low or medium resistance, as shown at 26 on phase 1 and that the break occurs this time nearer the station B than station A, then due to the charging current on phase 1, which is 90° in advance of the electromotive force, a condition of zero power factor exists on phase 1 causing, for the reasons stated, a zero pull by wattmeter element 4 with the corresponding operation of the wattmeter relay to open the oil switch 40 and indicate phase 1 as at fault. The relay at station B operates to open its switch and select phase 1 at fault due to the fall of potential on phase 1 to zero giving a zero pull by wattmeter element 7.

Let us consider now a condition of break on a feeder of a non-grounded neutral system. On non-grounded systems, I use as shown in Fig. 6 a different construction of ground responsive relay in combination with my phase selective relay. Assume a break occurs of the character shown at 77 on phase 3 causing both ends of the line wire to touch the ground. Wattmeter element 6 of my relay at station A and wattmeter element 9 of the relay at station B have a zero pull due to the drop in potential on phase 3 to zero causing the operation of both relays to selectively indicate phase 3 at fault and open the oil switches at both stations. My coöperating ground responsive relay also operates under this condition of break due to the fact that the potential of phase 3 to ground falls to zero. It is believed from the foregoing description that the operation of my protective relays on all other conditions of broken line wire will be apparent without further description.

My invention may be embodied in other forms than that shown and described and I, therefore, do not wish to be restricted to the precise construction shown, but intend to cover in the appended claims all changes and modifications which are within the scope of my invention and will be apparent to those skilled in the art.

What I claim as new and desire to secure by Letters Patent of the United States is:—

1. In a system of distribution, the combination with a feeder, of means for protecting said feeder upon the occurrence thereon of conditions occasioned by a broken line wire including a relay device differentially operated in response to the product of current, potential and power factor existing on each phase of the feeder when a line wire breaks to selectively indicate the phase of the feeder at fault.

2. In a system of distribution, the combination with a feeder thereof, of means for protecting said feeder under abnormal conditions occasioned by the occurrence of a broken line wire, including means responsive to the product of current, potential and power factor in each phase of said feeder, and means differentially operated in response to an unbalancing of said first mentioned means to selectively indicate the phase causing such unbalancing.

3. In a system of distribution, the combination with a feeder thereof, of a phase selective relay differentially operated in response to the product of current, potential and power factor on each phase of said feeder occasioned by a broken line wire to indicate the phase at fault, and a switch operative in response to the actuation of said relay to open the circuit of said feeder.

4. In a system of distribution, the combination with a feeder, of means for protecting said feeder upon the occurrence thereon of a broken line wire comprising a relay device differentially operated in response to the product of current, potential and power factor on each phase of said feeder to selectively indicate the phase of said feeder at fault, another relay operative in response to an unbalancing between each phase of said feeder and ground, and a switch operative in response to either of said relays to open the circuit of said feeder.

5. In a system of distribution, the combination with a feeder, a differentially operated wattmeter element relay operative in response to a load unbalancing on said feeder due to conditions of a broken line wire to selectively indicate the phase of said feeder upon which such broken line wire occurs, and a switch operative in response to the actuation of said relay to open the circuit of said feeder.

6. In a system of distribution, the combination with a feeder, of means for protecting said feeder upon the occurrence thereon of conditions occasioned by a broken line wire including elements responsive to the product of current, potential and power factor of each phase of said feeder, means differentially operated by said elements, and recording means actuated in response to the actuation of said first mentioned means to indicate the phase at fault.

7. In a system of distribution, the combination with a feeder thereof, of means for disconnecting said feeder from said system upon the occurrence thereon of all abnormal conditions occasioned by a broken line wire thereon and indicating the phase of said feeder at fault, including elements connected to each phase of said feeder responsive to the product of current, potential and power factor, means interconnecting said elements and differentially operated thereby, recording means selectively operated in response to the differential operation of said first mentioned means to indicate the phase at fault, and a switch connected to said feeder and opened in response to said first mentioned means.

8. In a system of distribution, the combination with a feeder thereof, of means for protecting said feeder upon the occurrence thereon of a broken line wire, including single phase wattmeter elements connected to the phases of said feeder, a contact making member differentially operated in response to said wattmeter elements, circuits selectively closed in repsonse to the movement of said member into switch closing position, means actuated in response to the selective closing of said circuits to indicate the phase at fault, and a switch controlled by said member to open the circuit of said feeder.

9. The method of protecting a feeder of a system of distribution upon the occurrence thereon of abnormal conditions occasioned by a broken line wire which consists in causing the unbalancing of the product of current, potential and power factor of each phase due to a broken line wire to operate a device and maintain an indication of the phase at fault and then causing the opening of the circuit of the faulty feeder.

10. In combination with a transmission line, a phase selective relay responsive to all abnormal conditions on said line due to a broken line wire including an element corresponding to each phase, each of said elements being operated in response to the product of potential, current and power factor, a member in common to said elements operative thereby with a differential action, and phase recording devices corresponding to said elements selectively actuated in response to the actuation of said relay to indicate the phase at fault.

11. In combination with a transmission line, a phase selective relay responsive to abnormal conditions on said line occasioned by a broken line wire, comprising a wattmeter element responsive to conditions on each phase, a member differentially movable by said elements into contact engaging position, said member having a contact engaging position corresponding to each wattmeter element, means for indicating the contact engaging position into which said member is moved, and an indicating device operative in response to the movement of said member into any of its contact engaging positions.

12. In combination with a transmission line, a relay responsive to a predetermined percentage of load unbalancing on said line, and means for maintaining said relay responsive to the same predetermined percentage of load unbalancing independent of the actual value of load on the line.

13. In combination with a transmission line, a phase selective relay responsive to abnormal conditions occasioned by a broken line wire including load responsive elements connected to each phase, means interconnecting said elements to cause said relay to operate differentially in response to a predetermined percentage of load unbalancing in said feeder, and means operatively related to said first mentioned means for maintaining said first mentioned means responsive to the same percentage of load unbalancing independent of the actual value of the load on the line.

14. The combination with a transmission line, of a phase selective relay responsive to abnormal conditions occasioned by a broken line wire including wattmeter elements connected to each phase, a member operatively related to all said elements and held in normal position as long as the pulls exerted on said member by said elements are equal but movable differentially in response to an unequal pull by said elements, and means operatively related to said member and responsive to the load on said feeder to cause a greater differential pull as the load on said feeder is increased to operate said member.

15. In combination with a transmission line, of a phase selective relay responsive to abnormal conditions occasioned by a broken line wire including wattmeter elements connected to each phase, a member operatively related to said elements and differentially operated thereby, a second movable member coöperating with said first mentioned member, springs connecting said members and adjustable to hold said first mentioned member in mechanical balance, and electroresponsive means responsive to the load on said feeder for positioning said second member and exerting a tension on said springs proportional to the load on the feeder.

16. In combination with a transmission line, a phase selective relay responsive to load unbalacing on said feeder comprising load responsive elements connected to each phase, means for holding said elements normally balanced against each other, and means normally positioned in response to the load on said line and coöperating with said first mentioned means to maintain the sensitivity of the relay to load unbalancing constant irrespective of the actual value of load on the feeder.

17. In a system of distribution having a plurality of feeders, of means for protecting said system from the occurrence thereon of a broken line wire including elements responsive to the product of current, potential and power factor in each phase of each feeder, means differentially operated by said elements in each feeder to select and indicate the phase of the feeder at fault and means for indicating that feeder of the system having the broken line wire thereon.

18. A relay including a plurality of wattmeter elements, a member operatively related to each of said elements and held normally balanced when the pull exerted by said elements are equal but differentially movable in response to an unbalancing between the pulls exerted by said elements, to assume a position corresponding to that element having the weakest pull.

19. A relay including a plurality of single phase wattmeter elements, a member operatively related to each of said elements and held normally balanced when the pull exerted by said elements are equal but differentially movable in response to an unbalancing between the pulls exerted by said elements to assume a position corresponding to that element having the weakest pull, and means for varying the amount of unbalancing necessary to operate said member.

20. A relay comprising three single phase wattmeter elements having movable and fixed coils, a three-armed member carrying on each arm the movable coils of said wattmeter elements, said member being movable differentially in response to said elements, contacts corresponding to each arm of said member adapted to be selectively engaged in response to the movement of the member, and phase recorders actuated in response to the engagement of said contacts.

21. In combination with a transmission line having its neutral point grounded, of a relay responsive to current in said neutral connection, and means coöperating with said relay for rendering it operative only on currents of generator frequency.

22. In combination with a grounded neutral connection of a system of distribution, a relay responsive to current flow through said grounded connection, means having a condenser action operatively related to the inductive winding of said relay to produce a condition of resonance in said relay circuit whereby said relay responds to magnified currents on said neutral connection of a specific frequency and is unresponsive to currents therein of any other frequency.

23. A relay for polyphase circuits comprising an element responsive to the product of current, potential and power factor in each phase, a member movable differentially in response to said elements having arms corresponding to each element, contacts engaged by each arm in response to a certain differential movement of said member under one condition, and independent contacts engaged by each arm in response to a predetermined movement of said member under another condition, and means operatively related to each contact to indicate its engagement.

24. In combination with a transmission line, a phase selective relay responsive to abnormal conditions upon said line occasioned by a broken line wire, including a wattmeter element responsive to conditions on each phase, a member differentially movable by said elements into contact engaging positions, contacts corresponding to said wattmeter elements located on one side of said member and adapted to be engaged by said member, a second set of contacts corresponding to said wattmeter elements located on the opposite side of said member and adapted to be engaged by said member, and means for indicating the engagement of either of said first mentioned or second set of contacts by said member.

In witness whereof I have hereunto set my hand this 6th day of April, 1916.

ELMER E. F. CREIGHTON.